United States Patent
Elkins

(10) Patent No.: US 6,383,544 B1
(45) Date of Patent: May 7, 2002

(54) METHOD AND APPARATUS FOR PREPARING MASH IN THE PRODUCTION OF ANIMAL FEED PELLETS

(75) Inventor: Raeford Elkins, Goldston, NC (US)

(73) Assignee: Mountaire Corporation, North Little Rock, AR (US)

(*) Notice: Subject to any disclaimer, the term of this patent is extended or adjusted under 35 U.S.C. 154(b) by 0 days.

(21) Appl. No.: 09/877,535

(22) Filed: Jun. 8, 2001

(51) Int. Cl.$^7$ .............................. A23L 1/00; A23K 1/00
(52) U.S. Cl. ........................... 426/511; 99/470; 99/483; 426/454; 426/516
(58) Field of Search ................................... 426/510, 511, 426/516, 447, 448, 454; 99/470, 483; 425/205, 308

(56) References Cited

U.S. PATENT DOCUMENTS

| | | | | |
|---|---|---|---|---|
| 3,336,137 A | * | 8/1967 | Hickey | 426/510 |
| 5,652,009 A | * | 7/1997 | Mair | 426/510 |
| 5,744,186 A | | 4/1998 | Harrison | 426/516 |

* cited by examiner

*Primary Examiner*—George C. Yeung
(74) *Attorney, Agent, or Firm*—Womble Carlyle Sandridge & Rice, PLLC

(57) ABSTRACT

A method of preparing mash for extrusion into animal feed pellets is provided. The method includes conveying the mash along the length of a pre-conditioning chamber while injecting steam at a first temperature into the pre-conditioning chamber to heat and pre-condition the mash. The pre-conditioned mash is then transferred from the pre-conditioning chamber to a conditioning chamber and is conveyed along the length of the conditioning chamber while injecting steam at a second temperature into the conditioning chamber. In one embodiment, the steam injected into the conditioning chamber is superheated steam and the second temperature is higher than the first. In another embodiment, the steam injected into the pre-conditioning chamber is superheated steam and the first temperature is higher than the second. The mash is discharged from the conditioning chamber for delivery to a pellet mill for being extruded into feed pellets. The combination of residence time and temperatures within the pre-conditioning and conditioning chambers produces an animal feed of superior quality and nutritional value at reduced production costs.

27 Claims, 1 Drawing Sheet

METHOD AND APPARATUS FOR PREPARING MASH IN THE PRODUCTION OF ANIMAL FEED PELLETS

TECHNICAL FIELD

The present invention relates generally to the preparation of animal feed and more particularly to the preparation of mash for subsequent formation into animal feed pellets.

BACKGROUND

Feed for chickens, swine, and other animals raised for human consumption traditionally is prepared from a mash. The mash is prepared according to a recipe and may include a mixture of many ingredients including, for example, cereal grains, plant and animal proteins, fats, roughage, liquids, and other products in predetermined proportions. The mash usually is delivered from a holding bin to a conditioner in which moisture and heat are applied to the mash to cook and condition it. From the conditioner, the conditioned mash may be delivered to a pellet mill, where it is extruded through dies into feed pellets, which subsequently are cooled and dried to form the final feed product for consumption by animals.

Traditional pellet mills for extruding mash into feed pellets may include foraminous annular dies with internal rollers that force the mash though openings in the dies to extrude it into pellets. Pellet mills generally are driven by electric motors that may vary anywhere from 25 to over 600 horsepower. Extruding the mash through a die is a complex Theological process of deformation and flow conditioned upon stress, strain, and time. The load on the die and thus the efficiency of the pellet mill and the quality of the pellets produced primarily is dependent upon the rate at which mash is fed to the pellet mill and the composition of the mash, its moisture and temperature content, the degree to which it is gelatinized or plasticized and the degree of its deaeration.

Improving the gelatinization or plasticization of the mash advantageously results in decreased horsepower requirements, better pellet quality, and increased feed production efficiency. Unfortunately, many conventional feed mills lack the high intensity, high temperature conditioning required to bring about gelatinization levels necessary to realize these advantages. Further, the addition of steam of more than abouth 3% in conventional systems causes problems for the pellet extrusion process and results in an increase in temperature of only about 50 degrees C, which generally is too short lived to create the desired conditioning effects. Additionally, in conventional devices, high fat content acts as a barrier to moisture thereby obstructing its diffusion into the mash and resulting in poor pellet quality.

A variety of attempts have been made to improve the conditioning of the mash prior to its extrusion into pellets in a pellet mill. For example, expanders have been developed for treating the mash after it has been conditioned in a conditioning chamber but before it is fed to a pellet mill. In general, an expander is a mechanical device that subjects the mash to extreme mechanical pressure, friction, and shearing forces. These extreme conditions heat the mash through conversion of mechanical energy and the resulting friction to heat and tends to rupture the starch molecules and cause the feed particles to aggregate into clumps. As a result of these and other effects, gelatinization and plasticization of the mash are improved, which improves the efficiency of extrusion into pellets, enhances the pellet quality, enhances protein digestability within the final feed product, and results in faster glucose influx in the gut after feed consumption. It also is believed that subjecting the mash to the drastic pressure drop upon leaving the expander results in rupture of the cell walls and consequent killing of undesirable micro-organisms such as salmonella within the mash. Once the mash exits an expander, it is cooled prior to entering the pellet mill, where it is extruded into pellets.

While expanders certainly have improved the conditioning of mash prior to extrusion into feed pellets, they nevertheless have certain inherent problems and shortcomings. Primary among these is the amount of costly energy in the form of electricity required by the electric motors that power such expanders. Because of the inherent inefficiencies in converting mechanical energy into the heat and stress required to improve the quality of the mash, motors in the several hundred horsepower range are required and these motors draw large electrical currents and are expensive to operate. For example, typical throughputs of from about 1.5 to about 30 tons of feed produced per hour can require from about 75 to about 315 kW per hour of electricity just to operate the expander. In many instances, these increased costs are prohibitive. Further, the high stresses and mechanical action of expanders means that they are subject to frequent maintenance and repair, which results in production down time and even higher operating costs.

At least one alternative to mechanical expanders has been developed. U. S. Pat. No. 5,744,186 of Harrison discloses a process for preparing animal food pellets that is claimed to obtain the advantages of expanders without their high costs of operation. The Harrison process contemplates a superatmospheric mash conditioning chamber that essentially is a pressure cooker within which the mash is subjected to high pressures and high temperatures of about 30 psi and about 260 degrees F from the time it enters the conditioning chamber until it leaves the die as pellets. An expander is not used in the Harrison process and continuous high pressure is maintained between the conditioning and extrusion steps. Harrison contends that this pressure cooker-type conditioning results, inter alia, in better pellet characteristics than expanders, increased geletanization and plasticization of the mash for improved extrusion efficiency, increased digestibility, increased nutritional value of the feed pellets, increased amino acid content, and advantageous inactivation of undesirable micro-organisms such as salmonella, mycotixins, karnal bunt, botulism, listeria, *E. coli*, and others.

While the superatmospheric conditioning chamber of Harrison may have certain advantages over expanders, it nevertheless also carries its own problems and disadvantages, some of which are acknowledged by Harrison itself. For instance, because of the requirement to maintain high pressures and temperatures throughout the conditioning process, Harrison discloses that the chamber as well as the die and roller apparatus of the pellet mill must be specially designed to withstand continuous high temperatures and pressures. Further, the maintenance of high pressure requires that the entire production line from the input hopper to the pellet mill itself be sealed in some fashion. These seals are provided by a specialized compression plug seal at the inlet hopper, which requires additional energy, and other types of seals throughout the mechanism. Accordingly, while Harrison may be an advance over traditional expanders, it is far from a completely satisfactory solution to the problem.

A need therefore exists for an improved method and apparatus for preparing mash for the production of animal feed pellets that successfully addresses the problems and shortcomings of the prior art. Such a method and apparatus should result in high quality animal feed pellets without the high energy consumption of expanders or the problems attendant the pressure cooker approach of Harrison. It is to the provision of such a method and apparatus that the present invention is primarily directed.

SUMMARY OF THE INVENTION

Briefly described, the present invention, in a preferred embodiment thereof, comprises a method of preparing mash for extrusion into animal feed pellets. The method, in one embodiment thereof, includes the steps of introducing the mash into a pre-conditioning chamber and heating the mash to a first temperature within the pre-conditioning chamber by injecting steam at a temperature of about 220 degrees F into the pre-conditioning chamber with the mash. The mash is pre-conditioned and heated by the steam to a first temperature of about 160 degrees F as it is conveyed by a mixing screw assembly along the pre-conditioning chamber from the upstream end to the downstream end thereof. At this temperature, the mash is pre-conditioned and the cooking of starches within the mash is initiated.

From the downstream end of the pre-conditioning chamber, the mash is transferred to the upstream end of a separate conditioning chamber, where it continues to be mixed and is conveyed by a mixing screw assembly to the downstream end of the conditioning chamber. Superheated steam, which has been heated in a superheater to a temperature between about 480 and 520 degrees F, is injected at the upstream end of the conditioning chamber and mixes with the mash as it moves along the length thereof. The superheated steam raises the temperature of the pre-conditioned mash to a second temperature of about 200 to 215 degrees F as it mixes with and moves along the conditioning chamber with the mash. This is a sufficient temperature to continue the cooking of the starches in the mash, expand and gelatinize the mash, kill potentially toxic micro-organisms such as salmonella and $E.\ coli$, and to deactivate most other potential toxins in the mash.

The total residence time of the mash in the pre-conditioning chamber and the conditioning chamber preferably is from about one minute to about one minute thirty seconds and most preferably about one minute fifteen seconds. From the conditioning chamber, the now completely conditioned mash is transferred to a conventional pellet extrusion mill, where it is extruded into pellets in the traditional way prior to being cooled and dried for transport and use.

The method of the invention obtains results that are equal or superior to those obtained with conventional expanders, but with significantly less required energy input and substantially lower maintenance requirements. Further, both the pre-conditioning chamber and the conditioning chamber operate at atmospheric pressure rather than the elevated pressures that must be maintained in pressure cooker type feed mill systems. Thus, the requirement for seals throughout the system to maintain the high pressures and the requirement that all of the internal components of the system be designed for pressurized operation are eliminated. Further, since the temperature of the steam injected into the pre-conditioning chamber and of the superheated steam injected into the conditioning chamber can be precisely controlled, the final temperatures reached by the mash in these chambers, which can be monitored, also can be controlled precisely. As a result, the quality of the finished feed pellets can be kept consistently high throughout long operating cycles by continuously monitoring and adjusting the feed rates, temperatures, and other parameters of the process.

The apparatus for carrying out the method of the invention comprises an elongated pre-conditioning chamber with an upstream end and a downstream end and an elongated conditioning chamber, also with an upstream end and a downstream end. An inlet chute is provided at the upstream end of the pre-conditioning chamber for introducing raw mash into the chamber and a rotating mixing screw assembly is disposed in the pre-conditioning chamber to mix and convey the mash toward the downstream end of the chamber. A steam injection manifold injects steam into the upstream end of the pre-conditioning chamber for mixing with, pre-heating, and pre-conditioning the mash in the pre-conditioning chamber. A chute is provided for transferring pre-conditioned mash from the downstream end of the pre-conditioning chamber into the upstream end of the conditioning chamber. Superheated steam from a superheater is injected through a steam injection manifold at the upstream end of the conditioning chamber and the superheated steam is mixed and conveyed along the conditioning chamber with the mash by a mixing screw assembly within the conditioning chamber. In this way, the mash is cooked, expanded, and gelatinized as described above. An outlet chute is provided at the downstream end of the conditioning chamber for transferring the mash to a conventional pellet extrusion mill, where it is extruded into feed pellets.

In an alternative embodiment of the invention, the superheated steam at a relatively higher temperature of between about 480 and 520 degrees F, is injected into the pre-conditioning chamber and steam at a relatively lower temperature of about 220 degrees F. is injected into the conditioning chamber. Thus, in this embodiment, the higher temperature superheated steam is injected into the pre-conditioning chamber rather than the conditioning chamber. The resultant feed pellets exhibit qualities that are essentially the same as with the first embodiment, but the mash is initially heated to a higher temperature in the pre-conditioning chamber by the superheated steam. Therefore, the scope of the invention includes injecting superheated steam either into the pre-conditioning chamber or into the conditioning chamber, or both, depending upon application specific goals and parameters.

Thus, a method and apparatus for preparing animal feed from mash is now provided that successfully addresses the problems and shortcomings of the prior art. Inefficient expanders are eliminated as is the requirement for maintaining high pressures within the system during processing. The resulting feed pellet product is of consistently high and highly controllable quality and is produced with substantially less total energy per ton than is possible in the prior art. These and other features, objects, and advantages of the invention will become more apparent upon review of the detailed description set forth below when taken in conjunction with the accompanying drawing figure, which is briefly described as follows.

DETAILED DESCRIPTION OF THE PREFERRED EMBODIMENT

Figure 1:
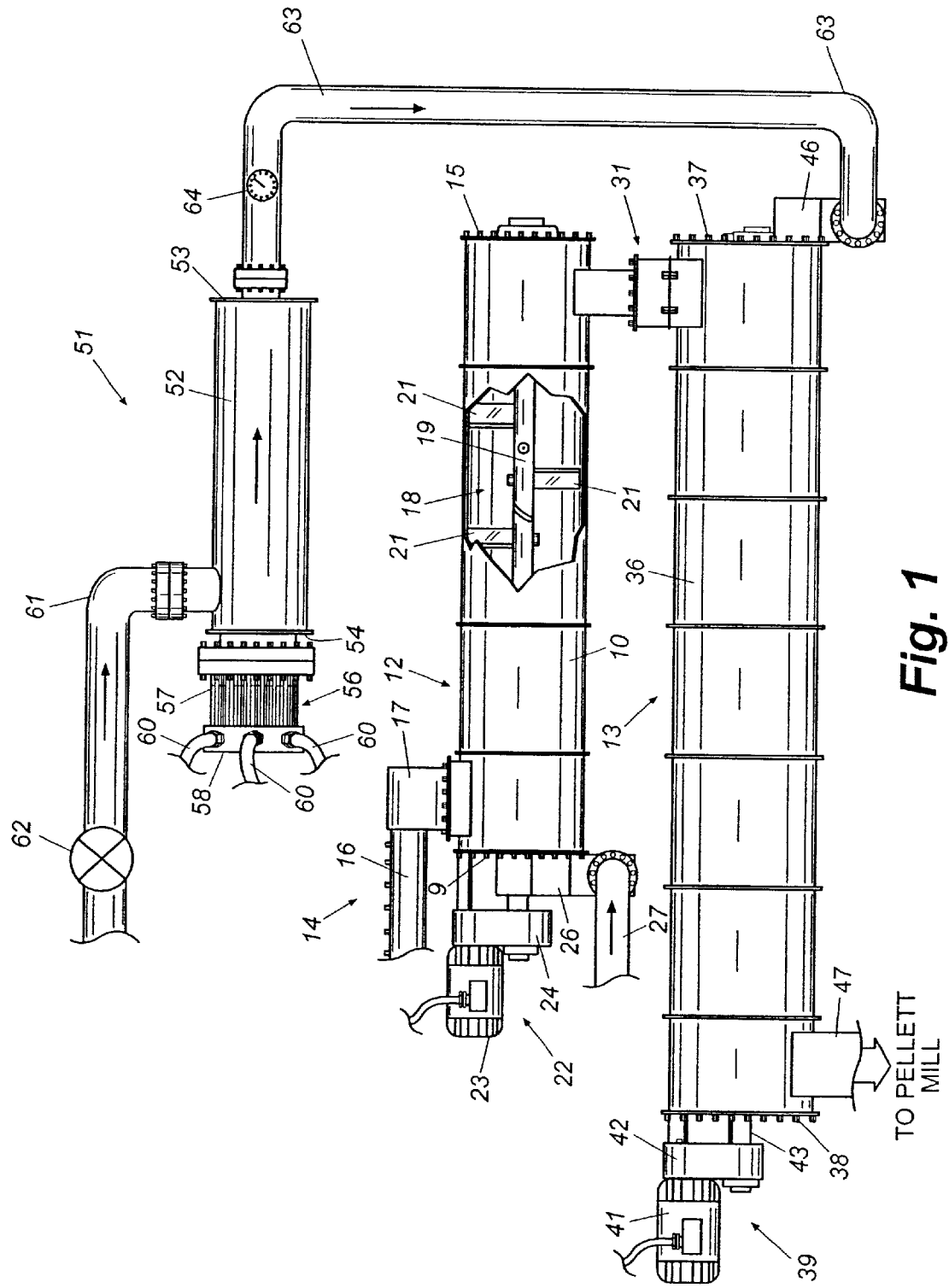
FIG. 1 is a functional diagram of an animal feed preparation apparatus that embodies principles of the present invention in a preferred form.

The invention will now be described primarily with respect to a system and method wherein steam is injected into a pre-conditioning chamber and superheated stem is injected into a subsequent conditioning chamber. However, it will be understood, as mentioned above, that this process may well be reversed with the superheated steam being injected into the pre-conditioning chamber and the steam being injected into the conditioning chamber. Indeed, superheated steam may be injected into both chambers under some circumstances to obtain a desired result. Thus, the invention should not be interpreted to be limited to the exemplary embodiment with respect to which the invention is described in detail below.

Referring now in more detail to the drawing, wherein reference numerals designate various elements in the illustration, the apparatus 11 includes as it major components a pre-conditioning chamber 12, a conditioning chamber 13, and a steam superheater 51. The pre-conditioning chamber 12 is generally cylindrical in shape and is formed by an elongated shell 10 capped at its ends by an upstream end cap 9 and a downstream end cap 15. In the preferred embodiment, the pre-conditioning chamber is approximately twenty-four inches in diameter and approximately ten feet long, although other dimensions may be selected depending upon application specific constraints.

A mash feed assembly 14 delivers raw mash to the upstream end of the pre-conditioning chamber 12 and includes an auger or screw feeder 16 for transporting mash from a storage location to an inlet hopper 17, through which the raw mash is delivered into the pre-conditioning chamber. A mixing screw assembly 18 is disposed within the pre-conditioning chamber and conventionally comprises an elongated axially extending shaft 19 from which an array of mixing and conveying paddles 21 radially project. The paddles 21 may be of any conventional construction as is understood by those of skill in the art. The shaft 19 is rotated by a drive mechanism 22, which consists of an electric motor 23 coupled to the shaft 19 through a transmission 24. When mash is delivered to the pre-conditioning chamber through the hopper 17 and the motor 23 is activated, the mixing screw assembly rotates to lift, aerate, and mix the mash within the pre-conditioning chamber and to convey it progressively from the upstream end toward the downstream end thereof.

A stem injection manifold 26 is mounted to the end plate 9 at the upstream end of the pre-conditioning chamber and communicates with the interior of the chamber. A steam supply pipe 27 is connected to the manifold 26 for delivering steam from a remote boiler (not shown) to the manifold and into the pre-conditioning chamber. The steam enters the pre-conditioning chamber at a temperature of about 215 to 220 degrees F and is mixed and conveyed along with the mash by the rotating mixing screw assembly 18. In the process, the steam flashes off moisture within the raw mash and raises the temperature of the mash to about 160 degrees F. As the mash and steam mix and travel toward the downstream end of the pre-conditioning chamber, the starches within the mash begin to cook. However, as is known in the art, the temperature of the mash within the pre-conditioning chamber generally is not sufficiently high to initiate gelatinization and plasticizing of the mash, to begin the expansion or fluffing of the mash, or to kill micro-organisms within the mash. This is one reason that mechanical expanders or pressure cooker type conditioning chambers have been used in the past to obtain the higher temperatures and other conditions necessary to initiate these processes. As discussed above, the present invention accomplishes this without the need for such devices.

A chute 31 communicates between the downstream end of the pre-conditioning chamber 12 and the upstream end of the conditioning chamber 13. The conditioning chamber, which also is cylindrical in shape, is formed from a cylindrical shell 36 capped by an upstream end cap 37 and a downstream end cap 38. In the preferred embodiment, the conditioning chamber is about thirty inches in diameter and about sixteen feet long, although, again, different sizes may be selected depending upon application specific constraints. In any event, the conditioning chamber generally is larger than the pre-conditioning chamber to accommodate the increasing volume of the mash as it is cooked and fluffs within conditioning chamber, as described in more detail below. A mixing screw assembly (not visible) is disposed in the conditioning chamber and is similar in construction to the mixing screw assembly 18 within the pre-conditioning chamber. As with the pre-conditioning chamber, the shaft 43 of the mixing screw assembly is rotated within the conditioning chamber by a drive mechanism 39 consisting of an electric motor 41 coupled to the shaft through a transmission 42. When the drive mechanism 39 is activated, the mixing screw assembly within the conditioning chamber continuously mixes the mash in the chamber while progressively conveying it from the upstream end to the downstream end thereof, just as in the pre-conditioning chamber.

A steam injection manifold 46 is mounted to the upstream end cap 37 of the conditioning chamber and communicates with the interior of the chamber. A steam pipe 63 is coupled to the steam injection manifold 46 for delivering superheated steam to the manifold and into the conditioning chamber to be mixed with mash therein. The superheated steam that flows through the steam pipe 63 is provided by a superheater assembly 51 including a steam superheater 52. In the preferred embodiment, the steam superheater 52 is a commercially available product manufactured by the Emerson Corporation. Similar devices from other manufactures also may be available.

In the past, steam superheaters have been used in the tobacco processing and bakery industries among others but, to the inventor's knowledge, never in the animal feed processing industries. In any event, the superheater assembly 51 comprises a cylindrical superheater 52 capped by end caps 53 and 54. A header assembly 56 is mounted to end cap 54 and includes a plurality of electrical heating elements 57 fed through an electrical supply hub 58 by electrical wiring 60. The array of heating elements extend into and through the superheater to supply electrical induction heating. A stem supply pipe 61 is coupled to the superheater and supplies steam at a temperature of about 215 degrees F to the superheater. A mace needle valve 62 controls the flow of steam into and through the superheater 52 and the flow of steam, in turn, controls the final temperature of superheated steam exiting from the superheater at its downstream end.

From an initial temperature of about 215 degrees F, the steam is heated by the electric heating coils within the superheater to a temperature of between about 480 degrees F and about 520 degrees F. A temperature gauge and sensor 64 monitors the temperature of the superheated steam issuing from the superheater and, preferably, feeds this information to a central computer controller, which also is connected to, monitors, and controls all of the functional components of the apparatus, as is common in modern industrial processes. In this regard, virtually the entire process of preparing mash for and extruding it into animal feed pellets with the apparatus of the present invention is controllable remotely from a computer control room.

The superheated steam from the superheater assembly 51 is delivered through steam pipe 63 to the steam injection manifold 46 of the conditioning chamber 13. From the steam injection manifold, the superheated steam is injected into the conditioning chamber, where it mixes and is conveyed along the length of the chamber with the mash from the pre-conditioning chamber. The high temperature of the superheated steam heats the mash from its pre-conditioned temperature of about 160 degrees F to a temperature of between about 200 and about 215 degrees F. At these temperatures, several beneficial transformations occur in the mash. First, at about 205 degrees F, gelatenization of the mash is initiated, which gives the mash a plasticized consistency. This, in turn, makes the extrusion of the mash through the dies of the pellet mill more efficient and thereby reduces the energy required to operate the mill. Second, the elevated temperatures within the conditioning chamber continues the cooking of the starches, which was initiated within the pre-conditioning chamber, and which makes the final feed product more nutritious and digestible. Third, the conditions within the conditioning chamber cause the mash to expand or fluff to a larger volume, which again is advantageous in the extrusion of the mash into pellets. Finally, the temperatures and residence time of the mash within the conditioning chamber are sufficient to kill most varieties of harmful micro-organisms within the mash such as, for example, salmonella and *E. coli* bacteria, and also to deactivate a variety of toxins.

In practice, it has been found that the total residence time of the mash in the pre-conditioning and conditioning chambers should be between about one minute and about one minute thirty seconds, and most preferably about 1 minute fifteen seconds for a feed production rate of about 30 tons per hour. Further, the residence time of the mash within each of the chambers preferably is about the same, the mash spending about one-half of its time in the pre-conditioning chamber and about one-half of its time in the conditioning chamber. However, despite these preferred residence times and conditions, other residence times and conditions may well be selected depending upon application specific constraints such as, for example, desired production rate, the type of feed being prepared, the temperatures within the chambers, and the like. Thus, the invention is not intended to nor should it be limited to any particular processing parameters, but is adaptable in this regard to accommodate a variety of feed processing requirements.

By the time the mash reaches the downstream end of the conditioning chamber 13, it is fully cooked, gelatinized, detoxified, and completely conditioned for extrusion into pellets. An outlet chute 47 is coupled to the conditioning chamber at its downstream end. The fully conditioned mash falls through the outlet chute 47 and is delivered to a conventional pellet mill (not shown) where it is extruded through dies to produce feed pellets in the conventional way. From the pellet mill, the pellets are conveyed to a dryer, where they are dried and cooled to produce the final product.

The method of the invention may be carried out with the apparatus described above or with an apparatus wherein the superheated steam is injected into the pre-conditioning chamber instead of the conditioning chamber. In its broadest sense, the method comprises the steps of introducing the mash into a pre-conditioning chamber, heating the mash to a first temperature within the pre-conditioning chamber, transferring the mash from the pre-conditioning chamber to a conditioning chamber, heating the mash to a second temperature within the conditioning chamber, and transferring the mash from the conditioning chamber to a pellet mill for extrusion into feed pellets. In the pre-conditioning chamber, the mash (in the embodiment of FIG. 1) is heated to the first temperature by injecting steam into the pre-conditioning chamber with the steam being mixed and conveyed along with the mash within the chamber. The mash is heated to the second temperature in the conditioning chamber by injecting superheated steam into the conditioning chamber, the superheated steam mixing and being conveyed along the conditioning chamber with the mash. However, the superheated steam may be injected into the pre-conditioning chamber with the steam being injected into the conditioning chamber if desired. In the first instance, the mash is heated by the superheated steam within the conditioning chamber to a second temperature higher than the first temperature. In the second instance, where the superheated steam is injected into the pre-conditioning chamber, the mash may or may not be heated to a higher temperature in the pre-conditioning chamber than in the conditioning chamber depending upon the residence times, transfer rates, and moisture content of the mash as well as other factors.

In the embodiment of FIG. 1, the steam injected into the pre-conditioning chamber is at a temperature of about 215 degrees F and pre-heats the mash to about 160 degrees F. In contrast, the superheated steam injected into the conditioning chamber is at a temperature of between 480 and 520 degrees F and heats the mash to a temperature of between about 200 and 215 degrees F. Of course, where the superheated steam is injected into the pre-conditioning chamber rather than the conditioning chamber, these temperature relationships may be reversed or at least altered. The residence time of the mash in both chambers is between about 1 minute and about 1 minute thirty seconds and preferably about 1 minute 15 seconds with the residence time in each chamber preferably, but not necessarily, being about the same. As a result, the mash is completely cooked, conditioned, gelatinized, and sanitized, all at ambient pressure and without the use of a mechanical expander. Further, the process is highly controllable to produce feed of consistently high quality, high nutritional value, and digestibility.

The invention has been described herein in terms of preferred embodiments and methodologies that represent the best modes known to the inventor of carrying out the invention. It will be obvious to those of skill in the art, however, that many modifications might be made to the illustrated embodiments within the scope of the invention. For instance, the sizes and shapes of the two chambers have been illustrated as those preferred for the commercial production of animal feed pellets at a production rate of about 30 tons per hour. Obviously, however, other sizes and shapes of the chambers might selected for different production rates, different feed products, or different production requirements. Further, while steam and superheated steam are the preferred means of heating and conditioning the mash in the two chambers, other equivalent means such as radiant heaters or hot air might also be used, perhaps with comparable results. Finally, as mentioned several times above, while the invention has been described primarily in terms of a system wherein steam is injected into the pre-conditioning chamber and superheated steam is injected into the conditioning chamber, the opposite, i.e. a system wherein superheated steam is injected into the pre-conditioning chamber and steam is injected into the conditioning chamber, also is possible and contemplated. These and other additions, deletions, and modifications to the illustrated embodiments might well be implemented by skilled artisans without departing from the spirit and scope of the invention as set forth in the claims.

What is claimed is:

1. A method of preparing mash for the production of animal feed pellets comprising the steps of:

(a) introducing the mash into a pre-conditioning chamber;

(b) heating the mash to a first temperature within the pre-conditioning chamber;

(c) transferring the mash from the pre-conditioning chamber to a conditioning chamber;

(d) heating the mash to a second temperature within the conditioning chamber; and (e) transferring the mash from the conditioning chamber to a pellet mill for extrusion into feed pellets.

2. A method of preparing mash for the production of animal feed pellets as claimed in claim 1 and wherein step (b) includes introducing steam into the pre-conditioning chamber.

3. A method of preparing mash for the production of animal feed pellets as claimed in claim 1 and wherein step (d) includes introducing steam into the conditioning chamber.

4. A method of preparing mash for the production of animal feed pellets as claimed in claim 3 and further comprising the step of super-heating steam prior to introducing the steam into the conditioning chamber in step (d).

5. A method of preparing mash for the production of animal feed pellets as claimed in claim 4 and wherein the step of super-heating steam comprises passing the steam through a super-heater.

6. A method of preparing mash for the production of animal feed pellets as claimed in claim 1 and wherein step (b) comprises conveying the mash along the length of the pre-conditioning chamber for a predetermined time while introducing heat into the pre-conditioning chamber.

7. A method of preparing mash for the production of animal feed pellets as claimed in claim 6 and wherein the step of introducing heat into the pre-conditioning chamber comprises injecting steam into the pre-conditioning chamber.

8. A method of preparing mash for the production of animal feed pellets as claimed in claim 7 and wherein step (d) comprises conveying the mash along a length of the conditioning chamber for a predetermined time while introducing heat into the conditioning chamber.

9. A method of preparing mash for the production of animal feed pellets as claimed in claim 8 and wherein the step of introducing heat into the conditioning chamber comprises injecting steam into the conditioning chamber.

10. A method of preparing mash for the production of animal feed pellets as claimed in claim 9 and wherein the temperature of steam injected into the conditioning chamber is higher than the temperature of steam injected into the pre-conditioning chamber.

11. A method of preparing mash for the production of animal feed pellets as claimed in claim 10 and further comprising the step of super-heating steam prior to introducing the steam into the conditioning chamber.

12. A method of preparing mash for the production of animal feed pellets comprising the steps of:

(a) introducing mash into a pre-conditioning chamber;

(b) conveying the mash along the pre-conditioning chamber for a first predetermined length of time while injecting steam at a first temperature into the pre-conditioning chamber;

(c) transferring the mash from the pre-conditioning chamber into a conditioning chamber;

(d) conveying the mash along the conditioning chamber for a second predetermined length of time while injecting steam at a second temperature into the conditioning chamber; and (e) transferring the mash from the conditioning chamber to a pellet mill for extrusion into feed pellets.

13. A method of preparing mash for the production of animal feed pellets as claimed in claim 12 and further comprising the step of super-heating steam prior to injecting the steam into the conditioning chamber in step (d) to obtain steam at a second temperature higher than the first temperature.

14. A method of preparing mash for the production of animal feed pellets as claimed in claim 12 and wherein the sum of the first and second predetermined lengths of time is the residence time and wherein the residence time is between about one minute and about one minute thirty seconds.

15. A method of preparing mash for the production of animal feed pellets as claimed in claim 14 and wherein the residence time is about one minute fifteen seconds.

16. A method of preparing mash for the production of animal feed pellets as claimed in claim 13 and wherein the first temperature is between about 200 degrees F and about 215 degrees F.

17. A method of preparing mash for the production of animal feed pellets as claimed in claim 12 and wherein the conditioning chamber is larger in cross-sectional area than the pre-conditioning chamber.

18. A method of preparing mash for the production of animal feed pellets as claimed in claim 17 and wherein the conditioning chamber is longer than the pre-conditioning chamber.

19. An apparatus for preparing mash for the production of animal feed pellets comprising:

an elongated pre-conditioning chamber having an upstream end and a downstream end and containing a conveyer mechanism for conveying mash from said upstream end of said pre-conditioning chamber toward said downstream end of said pre-conditioning chamber;

an inlet hopper at said upstream end of said pre-conditioning chamber for introducing raw mash into said pre-conditioning chamber;

an elongated conditioning chamber having an upstream end and a downstream end and containing a conveyor for conveying mash from said upstream end of said conditioning chamber toward said downstream end of said conditioning chamber;

a transfer conduit for transferring mash from said downstream end of said pre-conditioning chamber into said upstream end of said conditioning chamber;

a discharge chute at said downstream end of said conditioning chamber for discharging mash from said conditioning chamber for subsequent extrusion into pellets;

a first steam injector on said pre-conditioning chamber coupled to a source of steam for injecting steam at a first temperature into said pre-conditioning chamber;

a second steam injector on said conditioning chamber coupled to a source of steam for injecting steam at a second temperature into said conditioning chamber; and a steam superheater for superheating steam prior to its delivery to at least one of said steam injectors.

20. An apparatus for preparing mash for the production of animal feed pellets as claimed in claim 19 and wherein said first steam injector is disposed at said upstream end of said pre-conditioning chamber.

21. An apparatus for preparing mash for the production of animal feed pellets as claimed in claim 20 and wherein said second steam injector is disposed at said upstream end of said conditioning chamber.

22. An apparatus for preparing mash for the production of animal feed pellets as claimed in claim 21 and wherein said second temperature is between about 480 degrees F and about 520 degrees F.

23. An apparatus for preparing mash for the production of animal feed pellets as claimed in claim 19 and wherein said conditioning chamber is larger in cross-sectional area than said pre-conditioning chamber.

24. An apparatus for preparing mash for the production of animal feed pellets as claimed in claim 23 and wherein said conditioning chamber is longer than said pre-conditioning chamber.

25. A method of preparing mash for extrusion into animal feed pellets comprising the steps of heating the mash to a first temperature for a first length of time in a pre-conditioner, transferring the mash to a conditioner, heating the mash to a second temperature for a second length of time in the conditioner, and discharging the mash from the conditioner for transfer to a pellet mill.

26. The method of claim 25 and wherein the step of heating the mash to a first temperature includes injecting steam at a first temperature into the pre-conditioner.

27. The method of claim 26 and wherein the step of heating the mash to a second temperature includes injecting superheated steam into the conditioner.

* * * * *